2 Sheets—Sheet 1.

H. G. BENDER.

Assignor of one-half to J. GRETHER.

PRINTING MACHINE.

No. 11,193. Reissued Sept. 22, 1891.

Witnesses
Jos. H. Blackwood
Albert B. Blackwood

Inventor
Horace G. Bender
by H. T. Fisher
Attorney

2 Sheets—Sheet 2.
H. G. BENDER.
Assignor of one-half to J. GRETHER.
PRINTING MACHINE.
No. 11,193. Reissued Sept. 22, 1891.
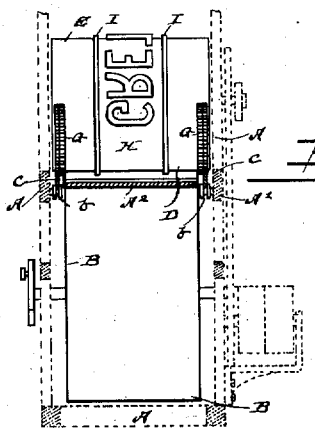
Fig. 3.
Fig. 4.
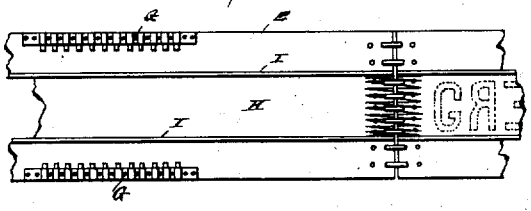
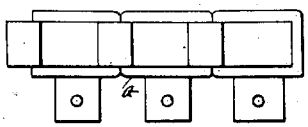
Fig. 5.
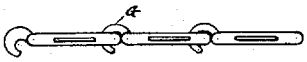
Witnesses
Jos. H. Blackwood
Albert B. Blackwood
Inventor
Horace G. Bender
by H. T. Fisher
Attorney

UNITED STATES PATENT OFFICE.

HORACE G. BENDER, OF AKRON, OHIO, ASSIGNOR OF ONE-HALF TO JOHN GRETHER, OF SAME PLACE.

PRINTING-MACHINE.

SPECIFICATION forming part of Reissued Letters Patent No. 11,193, dated September 22, 1891.

Original No. 419,240, dated January 14, 1890. Application for reissue filed May 5, 1890. Serial No. 350,698.

*To all whom it may concern:*

Be it known that I, HORACE G. BENDER, a citizen of the United States, residing at Akron, in the county of Summit and State of Ohio, have invented certain new and useful Improvements in Printing-Machines; and I do hereby declare that the following is a full, clear, and exact description of the invention, which will enable others skilled in the art to which it appertains to make and use the same.

My invention relates to improvements in printing-machines; and the invention consists in a machine especially adapted to sign-printing and the like, and which will print on rigid or flexible material, as boards, metallic plates, muslin, oil-cloth, and similar material, all as hereinafter fully described, and particularly pointed out in the claims.

Figure 1:
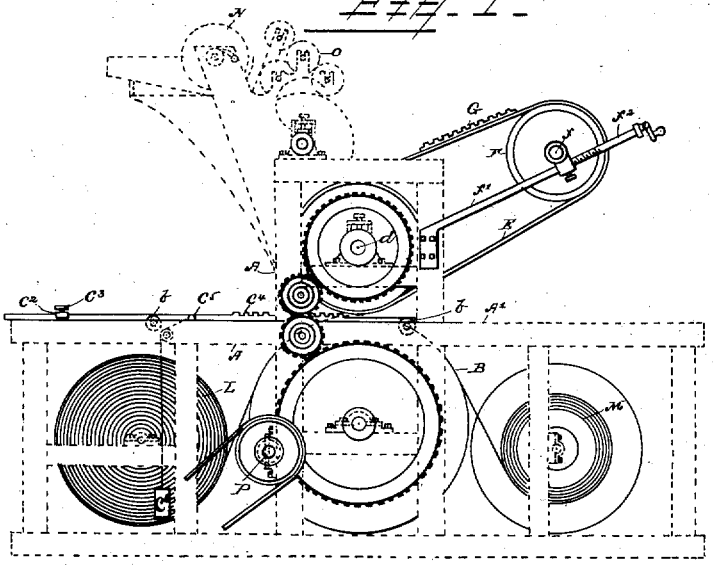
Figure 2:
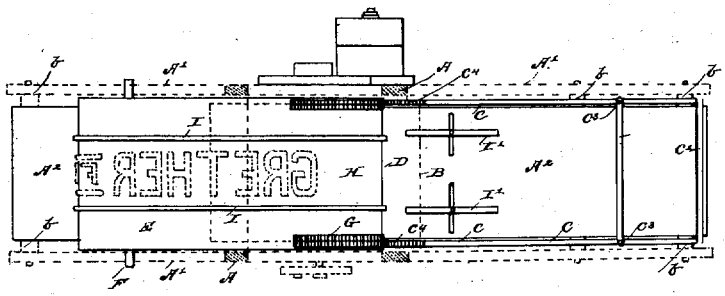

In the accompanying drawings, Figure 1 is a sectional elevation of my improved machine. Fig. 2 is a plan view of the machine with the ink-rollers and part of the frame above the bed removed. Fig. 3 is a sectional elevation on line *x x*, Fig. 2, with all the parts broken away, except those connected with the revolving bed and the impression-cylinder, giving a horizontal view between said cylinders and the revolving bed. Fig. 4 is a section of the form-carrier belt, showing the longitudinal guides and the manner of securing the flexible form thereon. Fig. 5 shows a section of sprocket-chain used on the carrier and both in plan and side view.

A represents the frame of the machine, the style or form of which is not material, provided that it accommodates the machinery and serves the purposes I have in view. Within the sides of the main portion or body of the frame is hung on a shaft the revolving bed B, so arranged that it will come on about a level with the portion of the frame indicated by the longitudinal bars A. The feed-table proper $A^2$ is fixed on the frame A on suitable supports slightly below the level of the revolving bed to facilitate feeding therefrom between the said bed and the impression-cylinder, and said table is cut away, so to speak, about its center to make room for the revolving bed. The elevation of the bed B above the feed-table need be but slight; but such elevation is desirable to facilitate the feed. Attention is called to Fig. 3, where the relative arrangement of these parts is shown.

Between the longitudinal bars A′ of the main frame and the fixed feed-table $A^2$ is arranged a moving feed-frame C, supported on grooved sheaves or rollers *b*, which serve as guides for said frame. The frame C consists of two longitudinal bars *c*, connected at their front ends by a cross-bar *c′*, and provided with an adjustable feed-regulating bar $c^2$ near their front ends. This feed-bar $c^2$ is held adjustably on the longitudinal bars *c* by set-screws and clamps $c^3$, or their equivalent and is designed to regulate and fix the point at which the printing shall begin with reference to the automatic feed-gear, as hereinafter fully described. It will be seen that the bars *c* are outside the ends of the revolving bed and the carrying or supporting cylinder D and do not come in contact with either of said parts. The said cylinder D is supported in adjustable bearings *d* directly above the revolving bed, and said bearings are cushioned above to permit an upward movement in case of inequalities or the like in printing. The bearings *d* may stand in vertical or inclined supports. The bed B and cylinder D revolve in unison, so as to give the requisite feed in printing.

In making duplicate or successive impressions of letters or characters on the same space much difficulty has been experienced in regulating the feed so as to bring the repeated impressions on identically the same place as the original impressions or in such relation thereto as may be determined upon for shading or other effects. I have overcome all difficulties in this respect and am enabled to make as many repeated impressions on the same space or the finest adjustments either way therefrom, as may be desired, and this by mechanism that cannot fail to perform its function at the right time and in the manner desired. To effect these results I have provided each bar *c* of the feed-frame C with teeth or gear $c^4$, arranged on the upper surface of said bars opposite each other, so as to act together. Then to mesh with these teeth or gear $c^4$ and to effect the feed of said frame C at the right time I provide the carrier-belt E, which passes round the cylinder D and the idler-pulley F, Fig. 1, with a series of sprocket-links or other suitable gear G. These links or gear are on the edge of the carrier, so as to leave the intervening space free for printing purposes as well as to make engagement with the gear on the feed-frame.

The idler-pulley F is hung in bearings $f$ on arms $f'$, extending back from the main frame, and screws $f^2$ are provided to adjust the said bearings back and forth on said arms, to obtain the desired tension of the belt and to adapt the idler to belts of different lengths. Motion is imparted to the belt and idler by the impression-cylinder, and when the sprocket-links are carried round to the front a sufficient distance they engage the teeth $c^4$ on the feed-bars, which starts said bars and carries them along the full length of the gear, but no farther. When this feed is exhausted, the feed of the opposed cylinders is supposed to begin, or is so far advanced on the type that it will continue by reason of such contact, and there is no longer need of feed by the gear. Ordinarily the type characters from which impressions are taken will be so placed on the carrier-belt that they will come into working position just before the sprocket-links pass out of engagement, thus permitting no motion in the feed to be lost; but the two feeds may act in conjunction and the type or characters on the belt may extend between the sprocket-links thereon.

The belt or form carrier E is of a fixed length and of the width of the bed, so as to adapt it to receive the largest size of type or other characters or two or more rows of the same on the form, if desired, and as it receives its motion from the cylinder D it must necessarily move with it at the same rate of speed. The fact of this uniformity of speed enables me, by fixing the initial feed-gear thereon, to always bring my impressions exactly where I want them. Take, for example, Fig. 2 for illustration. There we have in view the gear on the carrier and a certain fixed relation of the type to said gear, which relation, so far as this form is concerned, is unchangeable. Now going to the feed-frame carrying the article to be printed upon—say a sign-board—we find the end of the board at the front of the frame resting against the adjustable regulating cross-bar $c^2$ and the other end resting on the feed-table toward the cylinder D. This being the relation of the several parts and the machine being started, the feed-gear will first pass into engagement and continue to its end. Just before reaching the end the type of the form will have come around and taken position between the bed B and the cylinder D, and the feed of these parts will continue to act till the end of the type has been reached, which is toward the other extremity of the board. Meantime, the feed of the board being taken from the feed-gear by the cylinders, said gear and feed frame C have performed their allotted work, and the frame C immediately upon being relieved is carried back to its starting-point by the counter-weight C′, attached to a cross-bar $c^5$ of said frame by a cord or chain. The frame C, having returned exactly to its starting-point, is then in readiness to move forward a second time, and the sign-board, with its single impression, will be placed thereon exactly as it was originally against the cross-bar $c^2$, if a second impression is wanted on the same characters. Obviously the feed of the frame C cannot begin until the feed-gear comes into action, and the board being in the same position as before and the type in the same relation to the gear a repeated impression on precisely the same space must follow. The counter-weight C′ has sufficient weight to return the frame C to its normal position as soon as the feed-gear is disengaged and while the printing is going on.

On or around the carrier or belt E, I fix a flexible form-base H, preferably of canvas, though other suitable material may be used for this purpose, and said base is stretched upon the carrier and its ends fastened thereto by lacing or otherwise to prevent creeping on the carrier. Then, to hold the form apron or base in perfect alignment on the carrier, I provide slightly-raised flexible guide-strips I, glued, cemented, or otherwise temporarily and removably attached to the surface of the carrier in parallel lines and of such width apart that the type-form will rest snugly between the same. If wider or narrower canvas be used for the form, one or both of the strips I will be moved inward or outward, as may be required, and in no case will they be deep enough to interfere with the print. Correspondingly-adjustable guideways I′ are fixed on the table of the main frame.

The type or other characters employed are made of leather, and they are attached to the base or apron by glue, cement, or other temporary fastening, so as to be removable and in such relation to the feed-gear as to lose no motion in the feed when the gear has gone to the extent of its movement, as above described. The length of the forms is determined before they are put on the carrier, and the carrier and forms have each a certain fixed length, which remains unchanged for a given piece of work. If a longer impression is to be made than a given length of form and carrier afford, a carrier and form of greater length will be used.

The foregoing description relates to the use of the machine for printing on boards or other rigid materials which are fed horizontally on a bed, as herein described. The machine, however, is convertible to print on fabrics, oil-cloth, and the like, in which latter case the bolts of goods are supported on a suitable roller, as L, Fig. 1, and carried over the revolving bed B to be printed and then wound upon a suitable reel, drum, or roller M.

The type or other characters employed are made of leather; but other equivalent material may be used for this purpose. Preferably they are made of a leather-like belting, which has a hard smooth surface and a good body; but any kind of leather affording a suitable printing-surface and adapted to this work may be used.

Among the advantages of leather for this style and method of printing may be mentioned the following: Its flexibility, adapting it to the cylinders and a curved working surface; its yielding qualities, adapting it to such uneven surfaces as may occur in the material printed upon, and in spite of which it will produce full and clearly-defined impressions over the entire surface; its readiness to receive the ink or paint and to impart perfectly-uniform impressions and to clean itself with each impression, leaving its supply of paint on the material and coming away clean; its being proof against chemical deterioration from the paints, sizings, and the like used in this work; its comparative inexpensiveness and the ease with which it is cut, punched, stamped, or engraved to meet the demands of the great variety and character of the printing to be done, no two orders of which are alike. These and other advantages appear in leather characters, and especially adapt them to the work of a machine designed to print and operate as herein described. The form is made by laying the flexible support or apron on a flat surface and then adhering the characters temporarily thereto in the proper relation, just as type are set for ordinary printing, and when the printing has been done the characters are removed and washed. In this work the paint by which the printing is done is such as will stand exposure to the weather, like paint in ordinary sign-painting, the hand-work in which this machine is designed to substitute, as well as to do such other printing as it may be capable of. The feed-gear might be arranged on one side alone; but would not work as satisfactorily as on both sides.

A group of ink or paint rolls N O is shown in Fig. 1 above the cylinder S; but these in themselves are old, and in this machine serve the usual purpose of supplying and distributing ink or paint to the type-form. In any case, however, it is desirable to so distribute the same to the roller that it will be coated only the width of the characters on the form.

The cylinder D has vertically-adjustable bearings to adapt it to print on materials of different thicknesses, as well as to provide for possible differences in depth of type or other differences that may occur.

Suitable gears, belts, and pulleys are provided to convey motion to the several revolving parts from the shaft P.

Having thus described my invention, what I claim as new, and desire to secure by Letters Patent, is—

1. In a printing-machine, a flexible form consisting of a flexible apron or belt and flexible characters separately and detachably mounted immediately upon the surface of said apron or belt, in combination with a carrier for said form, substantially as described.

2. In a printing-machine, a flexible form-carrier, in combination with a flexible form stretched upon said carrier the entire length of the carrier, and having its ends temporarily fastened to the carrier, substantially as described.

3. In a printing-machine, an endless form-carrier having parallel strips detachably fastened to its surface and an endless flexible apron laid between said strips and fastened to the carrier, and flexible characters adhered to said apron, substantially as described.

4. In a printing-machine, a carrier and a form stretched one upon the other and fastened together, supports or guides for the form to keep it in alignment, a cylinder and roller on which the carrier and form are supported, and a revolving bed, substantially as described.

5. In a printing-machine, a cylinder and a roller, in combination with an endless form-carrier stretched over said cylinder and roller, and a printing-form stretched over said carrier, said form consisting of an apron having flexible characters adhered to the surface thereof, substantially as described.

6. In a printing-machine, a feed-frame supported on rollers on the main frame and provided with gear, in combination with a flexible carrier provided with gear meshing with the gear on said frame, and a carrying-cylinder and revolving bed arranged to work between said feed bars and gears, substantially as described.

7. In a printing-machine, a flexible carrier and a feed frame and gear on the edge of the said carrier meshing with gear on the edge of the said frame, and means to carry the frame back to its starting-point, substantially as described.

8. In a printing-machine, a flexible carrier provided with flexible gear along a portion of its edge, and a flexible form stretched over said carrier, in combination with a feed-table having feed-gear meshing with the gear on the carrier, a revolving bed, and a support for the carrier and form, substantially as described.

9. In a printing-machine, a form-carrier in the shape of an endless belt having gear along a portion of its edges on its outer surface and parallel strips on said surface serving as guides for the type-form, substantially as described.

10. In a printing-machine, an endless flexible carrier stretched over a carrying-cylinder and an idler, and an endless type-form stretched over said carrier, in combination with a revolving bed, substantially as described.

11. In a printing-machine, a revolving bed, a carrying-cylinder, and an idler, in combination with an endless carrier supported on the carrying-cylinder and idler and provided with guides to keep the type-form in alignment, and a type-form stretched lengthwise between said guides, substantially as described.

12. In a printing-machine, a stationary feed-table and a revolving bed, in combination with a movable feed-frame at the sides of said table, provided with an adjustable feed-regulating device and gear, a carrying-cylinder, and a flexible form-carrier on said cylinder, having gear meshing with the gear on the feed-frame, substantially as described.

13. In a printing-machine, a movable feed-frame provided with an adjusting device to regulate the feed of the material printed upon, and gear along its sides, in combination with a form-carrier having gear to mesh with the gear on said frame, and a form on said carrier, a carrying-cylinder, and a revolving bed, substantially as described.

Witness my hand to the foregoing specification this 19th day of April, 1890.

HORACE G. BENDER.

Witnesses:

ELIOTT NICKSON,

JAS. W. SCOTT.